United States Patent
Schöffner

(10) Patent No.: US 7,514,822 B2
(45) Date of Patent: Apr. 7, 2009

(54) ELECTRICAL POWER TRANSMISSION DEVICE HAVING A PHASE CONDUCTOR AND AN ENCASING CONDUCTOR

(75) Inventor: Günther Schöffner, Gaimersheim (DE)

(73) Assignee: Siemens Aktiengesellschaft, Munich (DE)

( * ) Notice: Subject to any disclaimer, the term of this patent is extended or adjusted under 35 U.S.C. 154(b) by 215 days.

(21) Appl. No.: 11/660,236

(22) PCT Filed: Jul. 29, 2005

(86) PCT No.: PCT/EP2005/053712

§ 371 (c)(1),
(2), (4) Date: Feb. 13, 2007

(87) PCT Pub. No.: WO2006/018371

PCT Pub. Date: Feb. 23, 2006

(65) Prior Publication Data

US 2007/0252443 A1 Nov. 1, 2007

(30) Foreign Application Priority Data

Aug. 13, 2004 (DE) .................. 10 2004 040 246

(51) Int. Cl.
*H01B 7/00* (2006.01)
*H01B 3/16* (2006.01)
(52) U.S. Cl. ..................................................... 307/147
(58) Field of Classification Search ................ 307/147
See application file for complete search history.

(56) References Cited

U.S. PATENT DOCUMENTS 5,530,200 A * 6/1996 Thuries et al. ................ 174/24

FOREIGN PATENT DOCUMENTS

DE     10016216 A1 * 10/2001

* cited by examiner

*Primary Examiner*—Stephen W Jackson
*Assistant Examiner*—Hal I Kaplan
(74) *Attorney, Agent, or Firm*—Laurence A. Greenberg; Werner H. Stemer; Ralph E. Locher

(57) ABSTRACT

An electrical power transmission device has a phase conductor and an encasing conductor. The phase conductor is used for transmission of an electrical power flow. The encasing conductor can be divided by way of a switching device.

12 Claims, 4 Drawing Sheets

ELECTRICAL POWER TRANSMISSION DEVICE HAVING A PHASE CONDUCTOR AND AN ENCASING CONDUCTOR

BACKGROUND OF THE INVENTION

FIELD OF THE INVENTION

The invention relates to an electrical power transmission device having a phase conductor and an encasing conductor, the phase conductor being used for transmission of an electrical power flow.

An electrical power transmission device such as this is known, for example, from Patent Specification U.S. Pat. No. 5,530,200. The electrical power transmission device there is in the form of a gas-insulated electrical line. Each of the phase conductors is in each case surrounded by a tubular encasing conductor. The interior of the encasing conductors is filled with an insulating gas, at an increased pressure. Gas-insulated lines have a very high current-carrying capability, by virtue of their design. Since the encasing conductors are resistant to compressed gas and must be sealed, they are designed with thick walls. This makes it possible for large return currents to be carried by the encasing conductor. Owing to the comparatively low impedance of a gas-insulated line and the high current-carrying capability, large short-circuit currents can occur in mesh-connected systems. Switching devices such as high-voltage circuit breakers can no longer cope with this, in some cases, there is therefore a risk of overloading the switching devices in the typical application of gas-insulated lines for the transmission of relatively large amounts of electrical power in existing system arrangements.

SUMMARY OF THE INVENTION

The invention is based on the object of refining an electrical power transmission device in such a manner that the rise in a short-circuit current is limited in a simple manner.

In the case of an electrical power transmission device of the type mentioned initially the object is achieved according to the invention via the capability to split the encasing conductor by means of a switching device.

The induction processes that occur in an encasing conductor such as that which is normally used in gas-insulated lines results in a return current. The magnitude and phase of the return current are in this case directed such that the magnetic fields which originate from the phase current flowing in the phase conductor and the return current flowing in the encasing conductor approximately neutralize one another. The provision of a switching device interrupts the flow of the return current in specific sections of the encasing conductor. The asymmetric conditions that this results in mean that the magnetic fields of the phase current and return current can no longer cancel one another out. A magnetic field now occurs outside the encasing conductor. This results in the overall arrangement having greater inductance. Since short-circuit currents must be limited, it is advantageous, for example, for the switching device to be in the form of a circuit breaker or power-electronic components, such as thyristors. If the phase current in the phase conductor is increased, the switching device can quickly interrupt the encasing conductor, thus increasing the inductance of the electrical power transmission device. A short-circuit current is limited by the increased inductance.

A further advantageous refinement can provide that between an input and an output of the electrical power transmission device the encasing conductor can be split into a greater number of sections that the phase conductor.

The use of a large number of sections makes it possible to finely graduate the influence of a short-circuit current. Depending on the characteristics of the short-circuit current, such as the amplitude and rate of the rise, this makes it possible to achieve limiting to a greater or lesser extent. This reduces the risk of overcompensation when excessively large sections of the encasing conductor are split.

Furthermore, it is advantageously possible to provide for the capability to split the encasing conductor during operation of the electrical power transmission device.

Splitting of the encasing conductor during operation ensures that it is possible to react quickly to processes in the system even when power is being transmitted via the electrical power transmission device. Individual sections of the encasing conductor can thus be specifically connected or else disconnected.

In this case, it may be advantageous to have the capability to split the encasing conductor by means of a switching device which can be switched repeatedly.

Switching devices which can be switched repeatedly, such as switch disconnectors, load interrupter switches on circuit breakers, can also be actuated by higher-level protection and monitoring devices. In this case, the switching responses on the individual switching devices can be matched to one another such that, for example, this results in cascade-like connection or disconnection of individual encasing conductor sections.

A further advantageous refinement makes it possible to provide for at least one and in particular each of the sections of the encasing conductor to be electrically grounded.

Low-impedance grounding of the encasing conductor in at least one case makes it possible for return currents flowing in the sheathing to be dissipated to ground. Particularly when the encasing conductor is split into a plurality of sections, return currents can thus be forced to be dissipated via specific grounding points.

Furthermore, it is advantageously possible to provide for a plurality of phase conductors and a plurality of encasing conductors to run parallel to one another, with at least one ferromagnetic body which influences the magnetic field of the electrical power transmission device being arranged between the individual encasing conductors.

The ferromagnetic body results in bundling of the magnetic flux which occurs outside the encasing conductors as well when the encasing conductors are split. The bundling additionally reinforces the inductive effect. Increasing inductance of the electrical power transmission device results in the short-circuit current in the event of a short circuit being influenced to a greater extent, that is to say the amplitude and phase of the short-circuit current are additionally influenced. In order to ensure that the effect on all of the phase conductors and all of the encasing conductors is as uniform as possible, it is advantageous to arrange the ferromagnetic body between adjacent encasing conductors in each case. In an arrangement with three phase conductors and three encasing conductors on one plane, two ferromagnetic bodies can thus each be arranged between the outer phase conductors/encasing conductors and the inner phase conductors/encasing conductors. In the case of a so-called delta arrangement of three phase conductors and three encasing conductors, it is advantageous to arrange the ferromagnetic body in the gap area in the electrical power transmission device. This provides uniform limiting for a short-circuit current in all of the phase conductors/encasing conductors.

Furthermore, it is advantageously possible to provide for a plurality of phase conductors and a plurality of encasing conductors to run parallel to one another, and for sections of different encasing conductors to be electrically transposed.

The transposed connection of individual sections of a plurality of parallel-running encasing conductors makes it possible to reduce the currents in the encasing conductors. Such transposition is also referred to as "cross bonding". The return currents in the encasing conductors are reduced by cyclically interchanging the electrical connections of individual sections of a plurality of encasing conductors. Since the magnetic fields caused by phase currents and reduced return currents no longer compensate for one another, this results in an increased magnetic field outside the encasing conductor. The inductance of the electrical power transmission device is increased by the reduced return current in the encasing conductor.

Variation of the inductance can be used not only to the limit short-circuit currents that occur. Furthermore, the variation of the impedance of an electrical power transmission device makes it possible to influence the direction of power flow within a network. Overloading of individual transmission lines can thus be deliberately prevented by the use of alternative paths, by varying the impedance of the power flow.

It is advantageously also possible to provide for at least one ferromagnetic body, which influences the magnetic field of the electrical power transmission device, to be arranged between the individual encasing conductors.

It is also possible to provide for one section of an encasing conductor to surround the phase conductor, in particular by being arranged coaxially with respect to the phase conductor.

The use of the encasing conductor to sheath the phase conductor protects the phase conductor against external mechanical influences. In particular, a coaxial arrangement of the encasing conductor and phase conductor makes it possible to produce uniform induction from a return current in the encasing conductor.

A further advantageous refinement can provide for the encasing conductor to be formed at least partially from a pressure-resistant tube.

In one refinement of the encasing conductor as a pressure-resistant tube, this tube can also be used as an encapsulation housing for a gas-insulated line. The pressure-resistant tube can then be used not only to provide mechanical robustness for the electrical power transmission device but also for gas-tight sheathing of the phase conductor.

The invention will be explained in more detail in the following text and is illustrated schematically in a drawing, on the basis of one exemplary embodiment.

In this case:

BRIEF DESCRIPTION OF THE DRAWINGS

Equivalent parts illustrated in the figures are provided with the same reference symbols.

DESCRIPTION OF THE PREFERRED EMBODIMENTS

Figure 1:
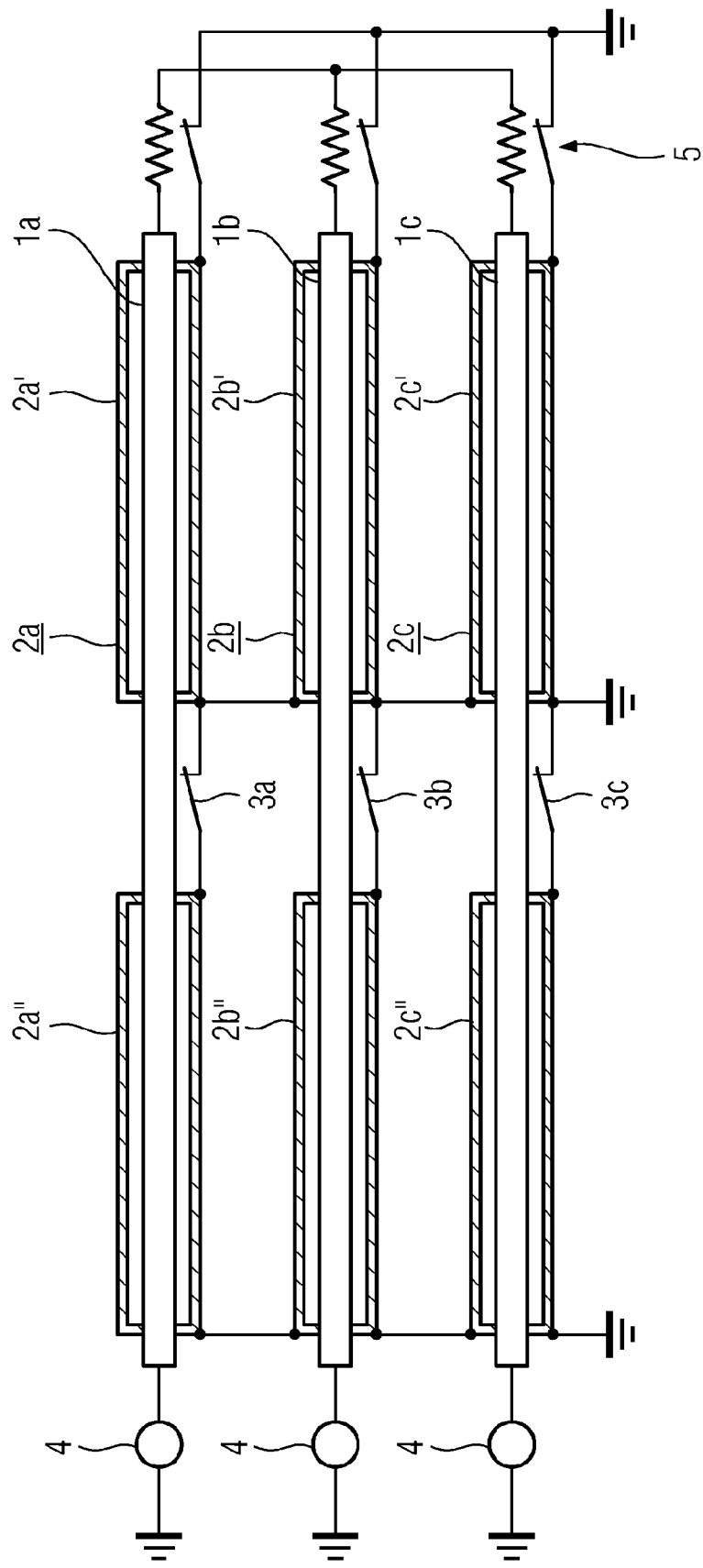
FIG. 1 shows a gas-insulated line with a switchable encasing conductor with the encasing conductor connected through, FIG. 2 shows the gas-insulated line with the encasing conductor interrupted.

FIG. 1 shows a schematic section view through a gas-insulated electrical line. The gas-insulated electrical line has a first phase conductor $1a$. The first phase conductor $1a$ is surrounded by a first encasing conductor $2a$. The encasing conductor $2a$ can be split by a first switch $3a$ into a first section $2a'$ and a second section $2a''$. A second phase conductor $1b$ as well as a third phase conductor $1c$, and a second encasing conductor $2b$ as well as a third encasing conductor $2c$, are arranged parallel to the first phase conductor $1a$ and the first encasing conductor $2a$. The three phase conductors $1a$, $1b$, $1c$ as well as the three encasing conductors $2a$, $2b$, $2c$ are identical, so that the second encasing conductor $2b$ and the third encasing conductor $2c$ can also be split respectively by means of a second switch $3b$ and a third switch $3c$ into a first section $2b'$, $2c'$ as well as a second section $2b''$ and $2c''$. The three phase conductors $1a$, $1b$, $1c$ and the three encasing conductors $2a$, $2b$, $2c$ are used to transmit an electrical power flow within a three-phase AC voltage system. A feeding electrical power supply system 4 is arranged on the input side of the gas-insulated electrical line, which acts as an electrical power transmission device. The electrical power supply system 4 has, for example, a plurality of generators or else feed points from adjacent electrical power supply systems. Grounding points are provided in the individual phases of the three-phase AC voltage system within the electrical power supply system 4, for example at substations. An electrical load 5 is arranged at the output of the gas-insulated electrical conductor. The load 5 is, for example, an industrial installation having a large number of electric motors, resistance heaters etc. When the power demand from the load 5 is high, large amounts of power can be transmitted from the electrical power supply system 4 via the gas-insulated line to the load 5. For this purpose, a gas-insulated line is formed from a phase conductor $1a$, $1b$, $1c$ which is surrounded by an encasing conductor $2a$, $2b$, $2c$. The encasing conductor $2a$, $2b$, $2c$ is in the form of a tube which has thick walls and is composed of electrically conductive material. The encasing conductor $2a$, $2b$, $2c$ is arranged in a gas-tight manner around the phase conductor $1a$, $1b$, $1c$. The interior of the encasing conductor $2a$, $2b$, $2c$ in the case of a gas-insulated electrical line is filled with an insulating gas at a raised pressure. In order to comply with the permissible direct-contact voltages, the encasing conductors $2a$, $2b$, $2c$ are each connected to ground potential. It is thus possible to lay the gas-insulated electrical lines directly in the ground, and there is no need to provide a direct-contact protective device for the encasing conductor $2a$, $2b$, $2c$.

The figures show, in each case schematically, an interruption point in the encasing conductor, which interruption point can be bridged by means of switches $3a$, $3b$, $3c$. In order to ensure compressed-gas insulation for the phase conductors $1a$, $1b$, $1c$ in this area as well, it is possible, for example, to use sections comprised of electrically insulating material, as compressed-gas encapsulation there. These electrically insulating sections can then be bridged by means of a switchable electrically conductive connection.

Figure 2:
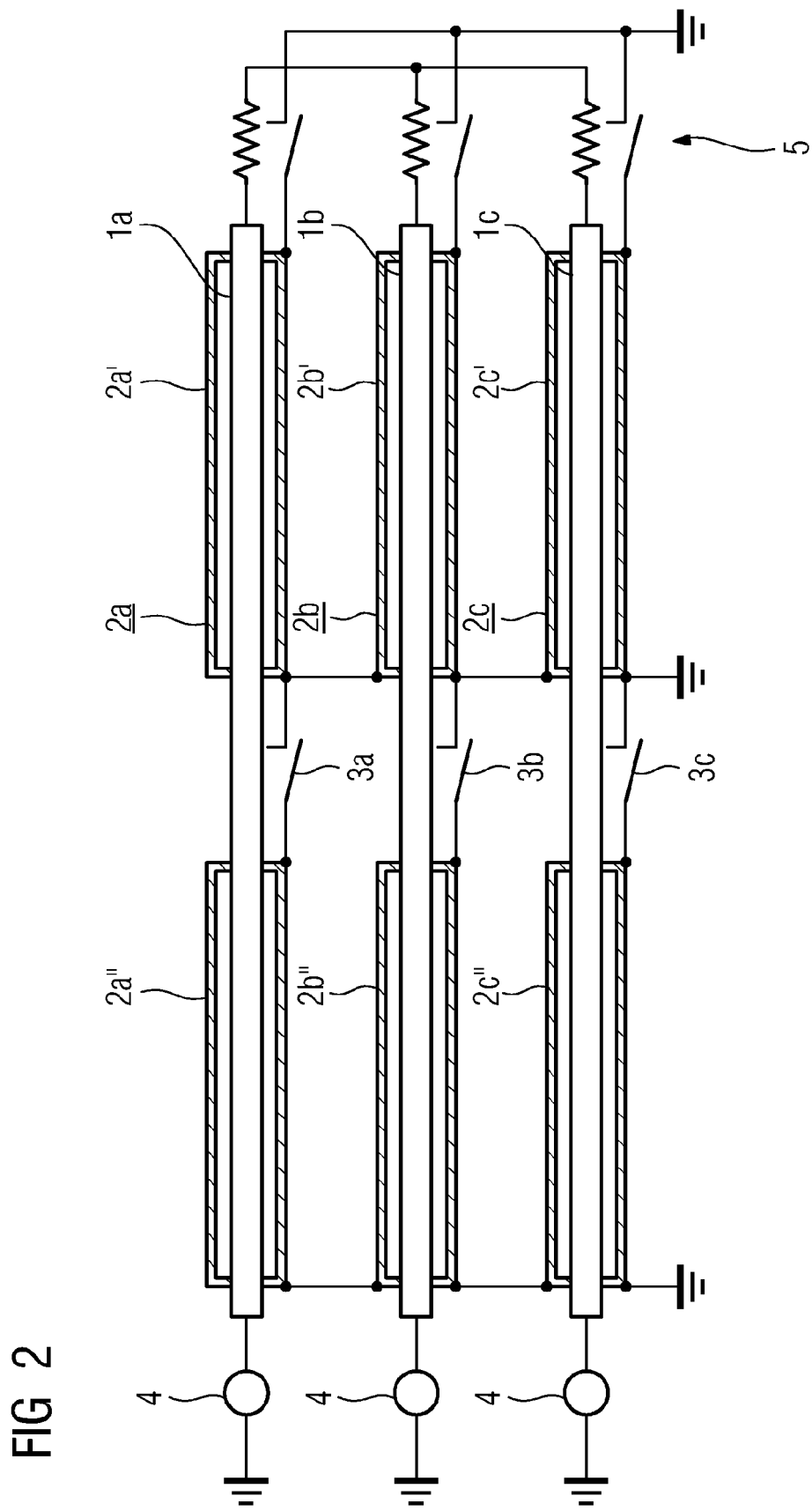

During normal operation of the load 5, the switches $3a$, $3b$, $3c$ are closed, so that the encasing conductors $2a$, $2b$, $2c$ are continuously electrically conductive. The phase current flows to the load 5 in the individual phase conductors $1a$, $1b$, $1c$. A so-called return current is induced in the encasing conductors $2a$, $2b$, $2c$ by electromagnetic induction. The return current is of approximately the same amplitude as the phase current in the phase conductors $1a$, $1b$, $1c$. However, its phase is offset through 180°. The self-induction of the electrical power transmission device is governed virtually exclusively by the arrangement formed from the encasing conductor 2a, 2b, 2c and the phase conductor 1a, 1b, 1c. The magnetic field outside the encasing conductors 2a, 2b, 2c is very small. If a short circuit occurs at the load end 5, the short circuit is fed from the electrical power supply system 4 via the gas-insulated line. In the case of a correspondingly high-power electrical power supply system 4, this can lead to a rapid rise in the short-circuit current, which can be coped with only with difficulty. The gas-insulated electrical line is in this case quite capable of carrying the short-circuit current. The magnitude of the short-circuit current to be coped with is essentially limited by the circuit breakers which are used and are intended to disconnect a short-circuit current such as this. When a short-circuit current is detected, the switches 3a, 3b, 3c are opened, thus splitting the encasing conductors 2a, 2b, 2c into a respective first section 2a', 2b', 2c' and a second section 2a", 2b", 2c" (see FIG. 2). By way of example, the switch can be tripped by monitoring the return current flowing in the encasing conductor 2a, 2b, 2c, or the switches 3a, 3b, 3c can be actuated by protective devices which monitor the phase current in the phase conductors 1a, 1b, 1c. Furthermore, the grounding connection of the encasing conductors 2a, 2b, 2c is split at the output end of the gas-insulated electrical line. The subdivision into a plurality of sections means that it is no longer possible for a return current to flow through the entirety of the encasing conductor 2a, 2b, 2c. This makes the overall system unbalanced, and the magnetic field also extends outside the encasing conductors 2a, 2b, 2c. This results in an increase in the inductance of the arrangement formed from the phase conductor and encasing conductor. The increased inductive component increases the total impedance of the gas-insulated electrical line (between the input end and the output end). The increased impedance limits the short-circuit current that flows. If the increase in the impedance is intended to be additionally assisted, it is also possible to arrange ferromagnetic bodies between the individual encasing conductors 2a, 2b, 2c or else outside the encasing conductors 2a, 2b, 2c (see FIGS. 4 and 5). The ferromagnetic bodies result in bundling of the magnetic field which occurs outside the encasing conductor 2a, 2b, 2c. The ferromagnetic body acts as an iron core.

Since, in the steady state, the magnetic fields caused by the current in the phase conductors 1a, 1b, 1c and the return currents in the associated encasing conductors 2a, 2b, 2c compensate for one another, the ferromagnetic bodies do not have any negative influence on the impedance of the gas-insulated electrical line when the encasing conductors 2a, 2b, 2c are connected through.

In addition to limiting of a short-circuit current, the splitting of the encasing conductors 2a, 2b, 2c can also be used in order to influence the impedance of an electrical power transmission device which is located within a network. The load flow in the network can be influenced and deliberately controlled by variation of the impedance of an individual electrical power transmission device within the power supply system.

Figure 3:
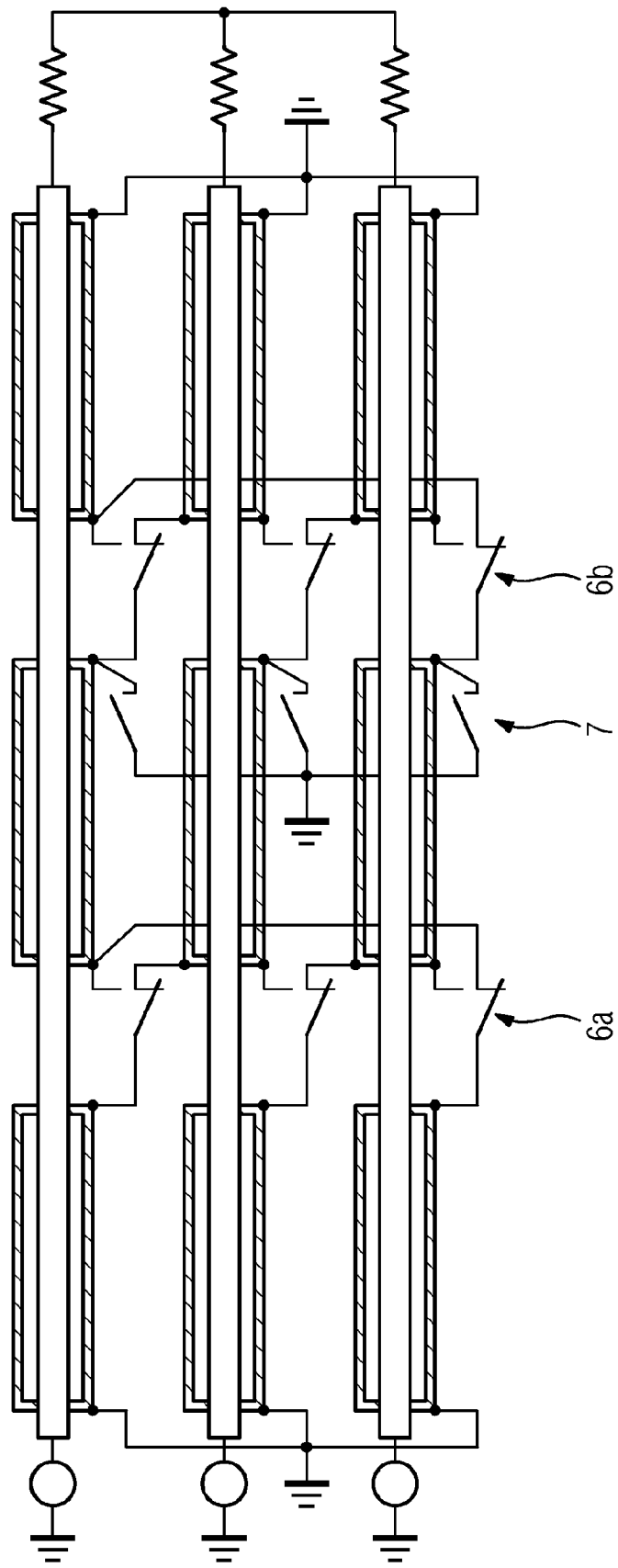
FIG. 3 shows a gas-insulated line with encasing conductor sections which can be connected interposed.

FIG. 3 illustrates the so-called "cross bonding" of the encasing conductor, schematically. The return current flowing in the encasing conductors is reduced by the cyclic interposing of individual sections of encasing conductors which are part of a three-phase system. If the return current is reduced, it is no longer possible to use the return current to compensate virtually completely for the magnetic field originating from the phase current flowing in the phase conductors. In this situation, magnetic fields can be detected outside the encasing conductors. The effect of these magnetic fields can also be increased by the introduction of ferromagnetic bodies between the encasing conductors. In order to achieve a reduction in the return current by interposition of encasing conductor sections, it is necessary to ground the input end and the output end of the gas-insulated conductor. Further grounding points can be disconnected during the "cross bonding" process. An appropriate switching device 6a, 6b makes it possible to split an encasing conductor that is connected through for one phase into a plurality of sections and to make an interposed electrical contact between individual sections of different encasing conductors of different phases in a three-phase system. Undesired grounding points 7 can then also be disconnected automatically, with appropriate coupling.

Figure 4:
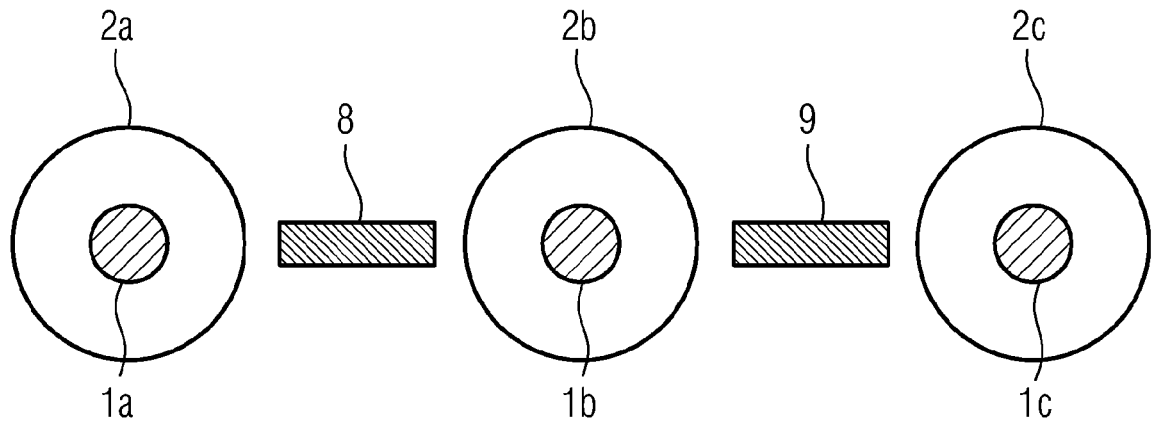
FIG. 4 shows a plurality of phase conductors and a plurality of encasing conductors laid on one plane.
Figure 5:
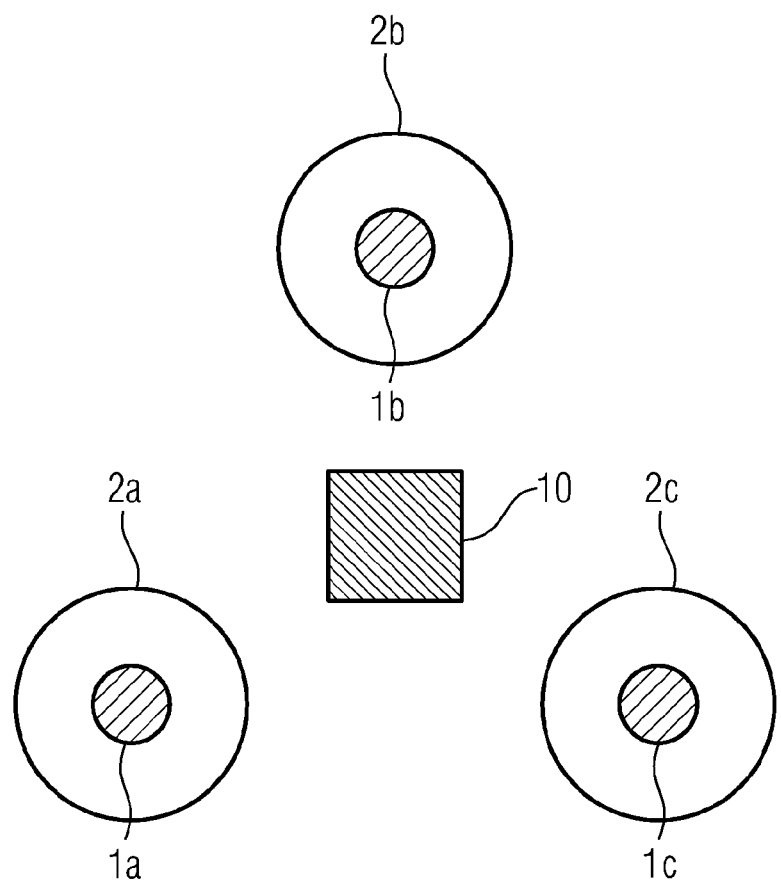
FIG. 5 shows a plurality of phase conductors and a plurality of encasing conductors laid in a delta arrangement.

FIG. 4 illustrates a laying arrangement for a gas-insulated electrical line, in which the three phase conductors 1a, 1b, 1c which are associated with a power transmission system for three-phase alternating current as well as the three encasing conductors 2a, 2b, 2c which are arranged coaxially with respect to the three phase conductors 1a, 1b, 1c, are laid on one plane. A first ferromagnetic body 8 as well as a second ferromagnetic body 9 are arranged between the encasing conductors 2a, 2b, 2c. The ferromagnetic bodies 8, 9 are used to bundle the magnetic field when the encasing conductors 2a, 2b, 2c are split, or cross-bonded. FIG. 5 shows three phase conductors 1a, 1b, 1c as well as three associated encasing conductors 2a, 2b, 2c in a delta arrangement. A third ferromagnetic body 10 is arranged in the center area of the delta and, when there is an unbalanced load on the phase conductors 1a, 1b, 1c and the associated encasing conductors 2a, 2b, 2c, guides the magnetic field which then occurs outside the encasing conductor. The ferromagnetic bodies can be produced in various forms and from different materials. By way of example it is possible to use coated bodies. The ferromagnetic bodies can also be arranged at further positions, which are not illustrated in FIGS. 4 and 5. For example, it is possible to provide for supporting racks to be designed to be particularly solid, and for these to be used as ferromagnetic bodies. The ferromagnetic bodies can also be arranged at the side of, above or below the encasing conductors 2a, 2b, 2c.

I claim:

1. An electrical power transmission device, comprising:
   a phase conductor configured for transmission of an electrical power flow;
   an encasing conductor; and
   a switching device connected to selectively divide said encasing conductor into sections.

2. The electrical power transmission device according to claim 1, wherein the power transmission device has an input and an output, and said encasing conductor can be split into a greater number of sections between the input and the output of the electrical power transmission device than said phase conductor.

3. The electrical power transmission device according to claim 1, wherein said encasing conductor is dividable during an operation of the electrical power transmission device.

4. The electrical power transmission device according to claim 1, wherein said switching device is configured for repeated switching and for splitting said encasing conductor by way of said switching device repeatedly.

5. The electrical power transmission device according to claim 1, wherein at least one section of said encasing conductor is connected to electrical ground.

6. The electrical power transmission device according to claim 1, wherein each of said sections of said encasing conductor is connected to electrical ground.

7. The electrical power transmission device according to claim 1, wherein a plurality of phase conductors and a plurality of encasing conductors are disposed to run parallel to one another, and at least one ferromagnetic body for influencing a magnetic field of the electrical power transmission device is arranged between individual said encasing conductors.

8. The electrical power transmission device according to claim 1, wherein a plurality of phase conductors and a plurality of encasing conductors are disposed to run parallel to one another, and sections of different said encasing conductors are connected to be electrically transposed.

9. The electrical power transmission device according to claim 8, which comprises at least one ferromagnetic body for influencing a magnetic field of the electrical power transmission device disposed between individual said encasing conductors.

10. The electrical power transmission device according to claim 1, wherein one section of said encasing conductor surrounds said phase conductor.

11. The electrical power transmission device according to claim 10, wherein said one section of said encasing conductor is disposed coaxially with respect to said phase conductor.

12. The electrical power transmission device according to claim 1, wherein said encasing conductor is formed at least partially from a pressure-resistant tube.

* * * * *